US009332450B2

(12) United States Patent
Rupp et al.

(10) Patent No.: US 9,332,450 B2
(45) Date of Patent: *May 3, 2016

(54) UNIT TESTING AND ANALYSIS OF MULTIPLE UUTS

(71) Applicant: NATIONAL INSTRUMENTS CORPORATION, Austin, TX (US)

(72) Inventors: Craig E. Rupp, Austin, TX (US); Gerardo Orozco Valdes, Austin, TX (US); I. Zakir Ahmed, Bangalore (IN); Vijaya Yajnanarayana, Bangalore (IN)

(73) Assignee: National Instruments Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,923

(22) Filed: Feb. 25, 2015

(65) Prior Publication Data

US 2015/0172943 A1    Jun. 18, 2015

Related U.S. Application Data

(63) Continuation of application No. 13/567,928, filed on Aug. 6, 2012, now Pat. No. 8,984,342.

(51) Int. Cl.
*G06F 11/26* (2006.01)
*H04W 24/08* (2009.01)

(52) U.S. Cl.
CPC .............. *H04W 24/08* (2013.01); *G06F 11/26* (2013.01)

(58) Field of Classification Search
CPC .................................................... G06F 11/277
USPC ................................................ 714/32, 33, 37
See application file for complete search history.

(56) References Cited

U.S. PATENT DOCUMENTS

| 6,915,113 | B1 | 7/2005 | Cardiff |
| 7,773,964 | B2 | 8/2010 | Ozaki |
| 7,856,231 | B2 | 12/2010 | Oh |
| 7,920,830 | B2 | 4/2011 | Cheng |
| 7,925,253 | B2 | 4/2011 | Breit |
| 8,269,529 | B2 | 9/2012 | Minassian |
| 8,463,189 | B2 | 6/2013 | Bashir |
| 8,467,756 | B2 | 6/2013 | Ozaki |
| 8,509,700 | B2 | 8/2013 | Schumacher |
| 8,674,874 | B2 | 3/2014 | Soualle |
| 2008/0129615 | A1* | 6/2008 | Breit ................ G01R 29/105 343/703 |
| 2009/0098868 | A1 | 4/2009 | Cheng |
| 2009/0260043 | A1 | 10/2009 | Tatsuta |
| 2010/0093285 | A1* | 4/2010 | Wang ................ H04B 17/3912 455/67.11 |

(Continued)

*Primary Examiner* — Chae Ko
(74) *Attorney, Agent, or Firm* — Meyertons Hood Kivlin Kowert & Goetzel, P.C.; Jeffrey C. Hood; Brian E. Moore

(57) ABSTRACT

Method and system for a test process. The method may include performing tests on one or more units under test (UUTs). At least one test on one or more UUTs may be performed. A signal may be acquired from the UUT. A reference signal may be retrieved. The reference signal may be derived from a transmitted signal characteristic of the UUT. The signal may be analyzed with respect to the reference signal. Results, useable to characterize the one or more UUTs, from performing the at least one test on the one or more UUTs may be stored. The reference signal may be derived from an initial test and may be stored for subsequent retrieval. A respective reference signal may be retrieved for all UUTs of the one or more UUTs for a respective test. The signal may be a radio frequency signal. The UUT may be a wireless mobile device.

23 Claims, 7 Drawing Sheets

(56) References Cited

U.S. PATENT DOCUMENTS

| | | |
|---|---|---|
| 2010/0121597 A1 | 5/2010 | Steffens |
| 2010/0173591 A1 | 7/2010 | Huber |
| 2010/0273433 A1* | 10/2010 | Ozaki .................... G01R 29/10 455/67.11 |
| 2011/0301905 A1* | 12/2011 | Gregg .................. G01R 35/005 702/106 |
| 2012/0001810 A1* | 1/2012 | Soualle .................. H01Q 3/267 343/703 |
| 2012/0208523 A1 | 8/2012 | Hans |
| 2013/0197850 A1 | 8/2013 | Yu |

* cited by examiner

UNIT TESTING AND ANALYSIS OF MULTIPLE UUTS

PRIORITY DATA

This application is a continuation of and claims priority to U.S. patent application Ser. No. 13/567,928, titled "Unit Testing and Analysis Using a Stored Reference Signal", filed Aug. 6, 2012, whose inventors are Craig E. Rupp, Gerardo Orozco Valdes, I. Zakir Ahmed, and Vijaya Yajnanarayana, which is hereby incorporated by reference in its entirety as though fully and completely set forth herein.

FIELD OF THE INVENTION

The present invention relates to the field of unit testing, and more specifically, to a system and method for performing tests, e.g., radio frequency tests, on units under test using a stored reference signal.

DESCRIPTION OF THE RELATED ART

To ensure reliable performance of a product, quality control has become a major part of manufacturing. Therefore, each unit manufactured is tested under a number of conditions to ensure quality. Each test may require a number of instruments to perform a measurement and based on the outcome of this measurement, a decision is made to mark the unit as pass or fail. Hence, manufacturing testing plays an important role in ensuring quality products in the marketplace. Additionally, the cost of running quality control tests in a manufacturing environment directly relates to the cost of products in the market place and a manufacturer's profit. The cost of testing can be further magnified in large quantity production facilities where each unit must pass a quality control test. In such instances, the most significant cost of running the quality control test is the time it takes to run each test.

In the radio frequency (RF) domain, these quality control measurements are complex and may take a substantial amount of time. The measurements are generally taken by a signal analyzer (SA). A flowchart for a typical method for performing a measurement is illustrated in FIG. 1. It should be noted that measurement 200 is typically performed multiple times for each unit under test (UUT). In 202, a signal, x(n), is acquired. The signal may be acquired by a SA. In 204, the distortions from the acquired signal are removed creating the reference signal, r(n). In some cases, removing the distortion to create the reference signal, r(n), may involve demodulating, including hard decision demodulating, and re-modulating the signal. In other cases, only demodulation, including hard decision demodulation, may be necessary. In either case, the signal processing required to create the reference signal is time intensive. In 206, any of various signal processing functions, including removing distortions from the signal x(n) using the reference signal, r(n), may be performed that compare and correlate the reference signal to the acquired signal, thereby resulting in a metric that measures the performance of the UUT. As mentioned, the measurement is repeated numerous times. Hence, any method that decreases the testing or processing time of the signal, will improve test throughput, thereby reducing testing time and manufacturing cost.

The basic method illustrated in FIG. 1 may be applied to several measurements when analyzing the RF signals for non-Orthogonal Frequency-Division Multiplexing (non-OFDM) cellular standards, such as Wideband Code Division Multiple Access (WCDMA), and the Code Division Multiple Access 2000 family of standards (CDMA2K). It may also be extended for measurements on OFDM cellular standards such as Global System for Mobile Communications-Enhanced Data rates for GSM Evolution (GSM-EDGE), Long Term Evolution (LTE), Worldwide Interoperability for Microwave Access (WiMAX), and Wireless Local Area Network (WiLan). Further, it may be extended for Time Division Multiple Access (TDMA) cellular standards, such as Global System for Mobile Communication (GSM). Typically, the metrics computed in 206 include Error Vector Magnitude (EVM), Modulation Accuracy EVM, Code Domain Power, EVM Quadrature Phase-Shift Keying (EVMQPSK), and so forth.

SUMMARY OF THE INVENTION

Embodiments of the present invention relate to systems and associated methods for performing a test process. In one embodiment, a method may utilize a computer to implement performing at least one test on one or more unit under tests (UUTs). A signal may be acquired from a UUT of the one or more UUTs. A reference signal may be retrieved, where the reference signal is derived from a transmitted signal that is characteristic of the UUT. The signal may be analyzed with respect to the reference signal. The results of the performance of the at least one test on the one or more UUTs may be stored. The results may be useable to characterize the one or more UUTs. In some embodiments, performing at least one test on the one or more UUTs may include performing at least one radio frequency (RF) test on at least one mobile wireless device.

In one embodiment, a marker may be used to synchronize the acquiring of the signal with the reference signal. In various embodiments, the marker may include a digital pulse, a software trigger, a power edge trigger, or a correlation method, e.g., a cross-correlation technique, or other form of signal synchronization. In some embodiments where the marker is a digital pulse, the acquiring of the signal may be initiated by an edge of the digital pulse, e.g., may be used to trigger the acquiring. In certain embodiments, performing the at least one test on the one or more UUTs may include generating a stimulus signal. The stimulus signal stimulates the UUT, and the signal from the UUT may thus be or include a response signal. In other words, the acquired signal may be in response to the stimulus signal, and thus may be a response signal. Accordingly, in some embodiments, the leading edge of the digital pulse may be synchronized to the initiation of the stimulus signal. Alternatively, in other embodiments, the leading edge of the digital pulse may be delayed for a time period from initiation of the stimulus signal, where the time period may be determined by or correspond to elapsed time between initiating an initial stimulus signal and receiving an initial response signal. In other words, the (trigger) pulse may be delayed to adjust for a representative latency between sending a stimulus signal and receiving a response to the stimulus signal, where, e.g., the representative latency may be based on an actual latency in an initial test (wherein the initial stimulus signal is sent, and the initial response signal is received) and may be characteristic of latencies regarding the at least one test on the one or more UUTs.

In yet another embodiment, the acquiring of the response signal may be initiated by the trailing edge of the digital pulse. The pulse width of the digital pulse may be a time period from initiation of the stimulus signal, where the time period may be determined by elapsed time between initiating an initial stimulus signal and receiving an initial response signal. In other words, the digital pulse may begin when the stimulus signal is initiated (or generated), and may trigger the acquiring once the expected latency period has elapsed, per the pulse width, where the pulse width is based on the above mentioned initial test (with the initial stimulus and initial response signal).

In certain embodiments, performing the at least one test on the one or more UUTs may include performing an initial test of the at least one test on an initial UUT of the one or more UUTs. The initial UUT may be representative of the one or more UUTs. To perform the initial test, a stimulus signal may be generated, where the stimulus signal stimulates the initial UUT and an initial response signal may be acquired form the initial UUT. A (or the) reference signal may be derived, where deriving the reference signal may include removing distortions from the initial response signal. The reference signal may be stored for subsequent retrieval, and the initial response signal may be analyzed with respect to the reference signal. In some embodiments, the reference signal may be one of a plurality of reference signals. In such embodiments, the reference signal may be retrieved based on determining one or more characteristics of the test (currently being performed, e.g., based on a test ID), the signal (transmitted from the UUT currently being tested of the at least one UUT), or, even the UUT (currently being tested) itself. In other words, the one or more characteristics may be determined, and the (appropriate) reference signal retrieved based on the determining.

Thus, in some embodiments, the at least one test may include a plurality of tests. In some of these embodiments, the reference signal may be one of a plurality of reference signals. Each respective reference signal may correspond to a respective test of the plurality of tests. The plurality of tests may be performed on a first UUT of the one or more UUTs. For each respective test of the plurality of tests a respective reference signal of the plurality of reference signals may be determined and a respective signal from the first UUT may be acquired. Additionally, the respective reference signal of the plurality of reference signals may be retrieved. The respective signal may be analyzed with respect to the respective reference signal.

In some embodiments, the one or more UUTs may include a plurality of UUTs. In some of these embodiments, a first test may be performed on each UUT of the plurality of UUTs. For each respective UUT of the plurality of UUTs, a respective signal from the respective UUT may be acquired. Additionally, a reference signal may be retrieved, e.g., from storage, possibly over a network. The respective signal may be analyzed with respect to the reference signal.

In yet further embodiments, the reference signal may be one of a plurality of reference signals, the at least one test may include a plurality of tests, and the one or more UUTs may include a plurality of UUTs. In such embodiments, each respective reference signal may correspond to a respective test of the plurality of tests and for each test of the plurality of tests a respective reference signal may be determined. Then, for each test of the plurality of tests for each respective UUT of the plurality of UUTs, a respective signal may be acquired from a respective UUT. Additionally, a respective reference signal may be retrieved and the respective signal may be analyzed with respect to the respective reference signal.

BRIEF DESCRIPTION OF THE DRAWINGS

A better understanding of the present invention can be obtained when the following detailed description of the preferred embodiment is considered in conjunction with the following drawings, in which.

Figure 1:
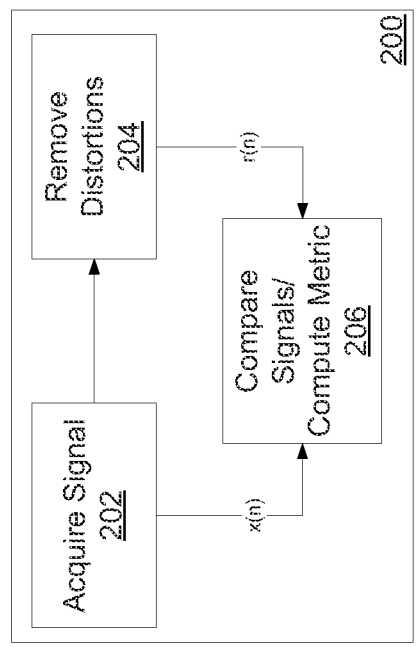
FIG. 1 illustrates a flow chart for an RF signal processing method, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Definitions and Conventions

Unit Under Test (UUT)—A physical device or component that is being tested.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Acquisition—refers to the acquiring of analog signals and converting the analog signals to digital data, e.g., bits.

Digital Signal—refers to a waveform that switches between two voltage levels representing the two states of a Boolean value (0 and 1).

Digital Pulse—refers to one cycle of a digital signal, i.e., the switch from a low voltage level (Boolean 0) to a higher voltage level (Boolean 1) and the switch back to the low voltage level (Boolean 0).

Leading Edge of Digital Pulse—refers to the transition from a low voltage level (Boolean 0) to a higher voltage level (Boolean 1).

Trailing Edge of Digital Pulse—refers to the transition from a higher voltage level (Boolean 1) to a low voltage level (Boolean 0).

Pulse Width—refers to the elapsed time between the leading edge and trailing edge of a digital pulse.

I/Q Data—I/Q data is a translation of amplitude and phase data from a Polar coordinate system to a Cartesian coordinate system. For example, the mathematical equation representing a sine wave can be expressed as in equation 1, where $A_c$ represents amplitude of the sine wave, $f_c$ represents the frequency of the sine wave, and $\phi$ represents the phase.

$$A_c \sin(2\pi f_c t + \phi) \quad (1)$$

In Polar coordinates, the sine wave can be represented in terms of the magnitude (amplitude), M(t), and phase, $\phi$(t), at any instant in time. To transform to Cartesian coordinates, equations 2 and 3 may be used to determine the I/Q data.

$$I(t) = M(t)\cos(\phi(t)) \quad (2)$$

$$Q(t) = M(t)\sin(\phi(t)) \quad (3)$$

Power Edge Trigger—The power, P(t), of the I/Q data may be calculated using equation 4.

$$Q(t) = I^2 + Q^2 \quad (4)$$

When plotted, P(t) will have a rising edge with a positive slope and a trailing edge with a negative slope. Edge detection may be used to detect either the rising edge or trailing edge of the power of the I/Q data and signal acquisition may be triggered from either edge.

Software Trigger—refers to a trigger to start an acquisition that is initiated via software. The software may be of any form, including, but not limited to, a graphical data flow program.

Correlation Methods—refers to a measurement of the similarity between two signals. Methods include auto-correlation and cross-correlation.

Auto-correlation—refers to the correlation of a times series with itself.

Cross-correlation—refers to the measurement of the similarity between two time series.

Carrier Signal—refers to a waveform, usually sinusoidal, that modulates an input signal for the purpose of conveying information as electromagnetic waves, in general, at a higher frequency that the input signal. A carrier signal is also referred to as a carrier.

Constellation—describes the I versus Q plot of the input signal.

Valid angle in the Constellation—refers to points in the IQ plane where the transmitter transmits at a known angular position for standard modulation techniques.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Multiprocessor System—a computer system that includes multiple processing elements, i.e., processors, processing cores, or even networked computers, that may operate in a coordinated manner to execute program instructions concurrently.

Concurrently—a manner of performing actions or processes such that at least a portion of the (concurrent) processes overlap in time, e.g., at least one of the processes executes at least one iteration while another process executes an iteration. Concurrence, as used herein, may be accomplished in any of multiple ways, including through the use of single processor systems, e.g., via multi-threading, time-slices, etc., or multiprocessor (or multicore) systems, as well as any other technique for processing functions at the same time.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "graphical user interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window, panel, or dialog box having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements include input controls and output indicators.

Input Control—a graphical user interface element for providing user input to a program. Exemplary input controls include buttons, check boxes, input text boxes, knobs, sliders, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data from a UUT. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

User Equipment (UE) (or "UE Device")—any of various types of computer systems devices which are mobile or portable and which performs wireless communications, such as mobile wireless devices. Examples of UE devices include mobile telephones (e.g., cellular telephones ("cell phones")) or smart phones (e.g., iPhone™, Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Figure 2A:
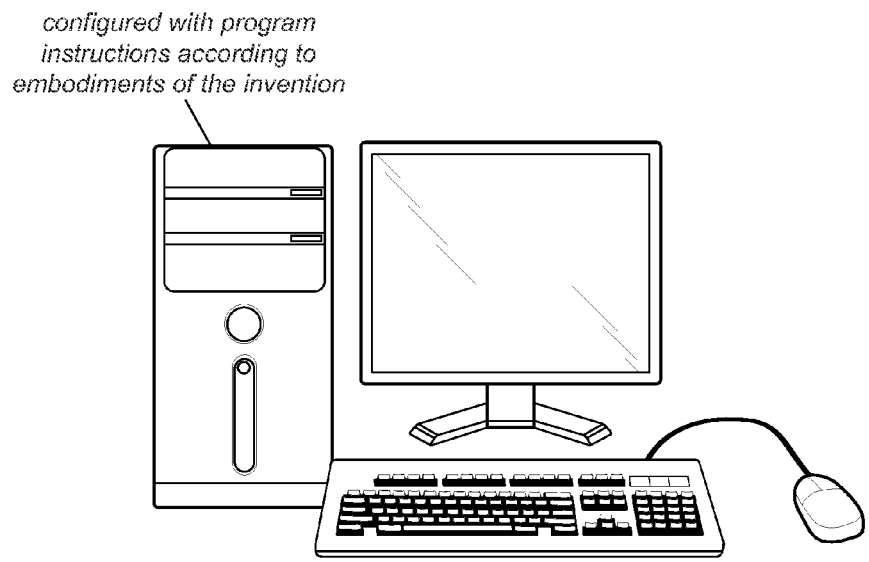
FIG. 2A illustrates a computer system, according to an embodiment of the invention.

FIG. 2A: Computer System

FIG. 2A illustrates a computer system 82 configured to implement embodiments of the present invention. More specifically, the computer system 82 may be configured to execute one or more programs, e.g., one or more graphical data flow programs, to execute unit testing and analysis using a stored reference signal as described below in detail.

As shown in FIG. 2A, the computer system 82 may include a display device. In some embodiments, the computer system 82 may be configured to display the (possibly graphical) program as the program is created and/or executed. The display device may also be configured to display a graphical user interface or front panel of the program during execution of the program. The graphical user interface may comprise any type of graphical user interface, e.g., depending on the computing platform.

The computer system 82 may include at least one memory medium on which one or more computer programs or software components according to one embodiment of the present invention may be stored. The memory may be coupled to one or more processors and store program instructions executable by the one or more processors. For example, the memory medium may store one or more programs, e.g., graphical programs, which are executable to perform embodiments of the methods described herein. Additionally, the memory medium may store a programming development environment application used to create and/or execute such programs. The memory medium may also store operating system software, as well as other software for operation of the computer system. Various embodiments further include receiving or storing instructions and/or data implemented in accordance with the foregoing description upon a carrier medium.

Figure 2B:
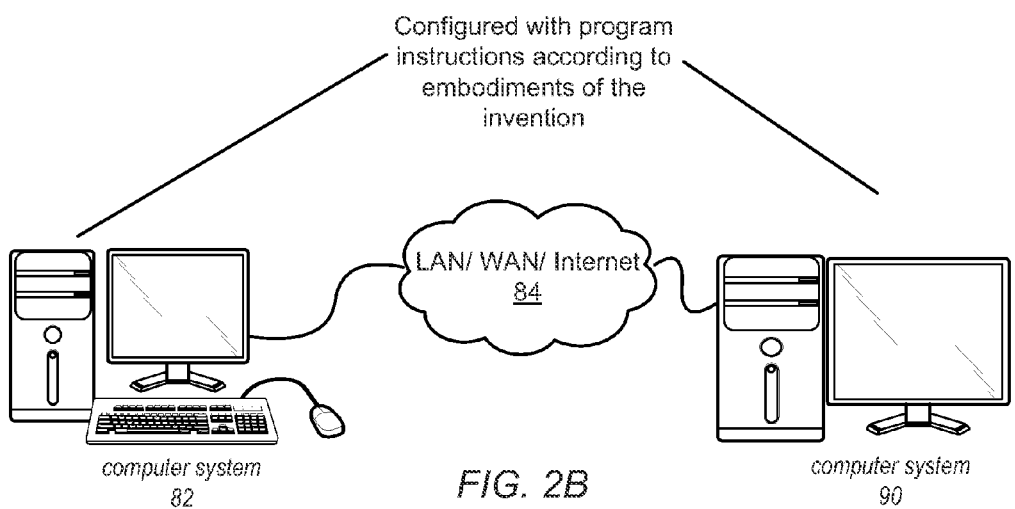
FIG. 2B illustrates a network system, according to one embodiment.

FIG. 2B: Computer Network

FIG. 2B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute programs, e.g., one or more graphical programs, in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the program may be displayed on a display device of the computer system 82, and the block diagram may execute on a device coupled to the computer system 82. The device may include a programmable hardware element and/or may include a processor and memory medium which may execute a real time operating system. In one embodiment, the program may be downloaded and executed on the device. For example, an application development environment with which the program is associated may provide support for downloading a program for execution on the device in a real time system. It should be noted that while various embodiments are described herein in terms of a graphical program implementation, any other types of programs or programming technologies may be used as desired.

Figure 3A:
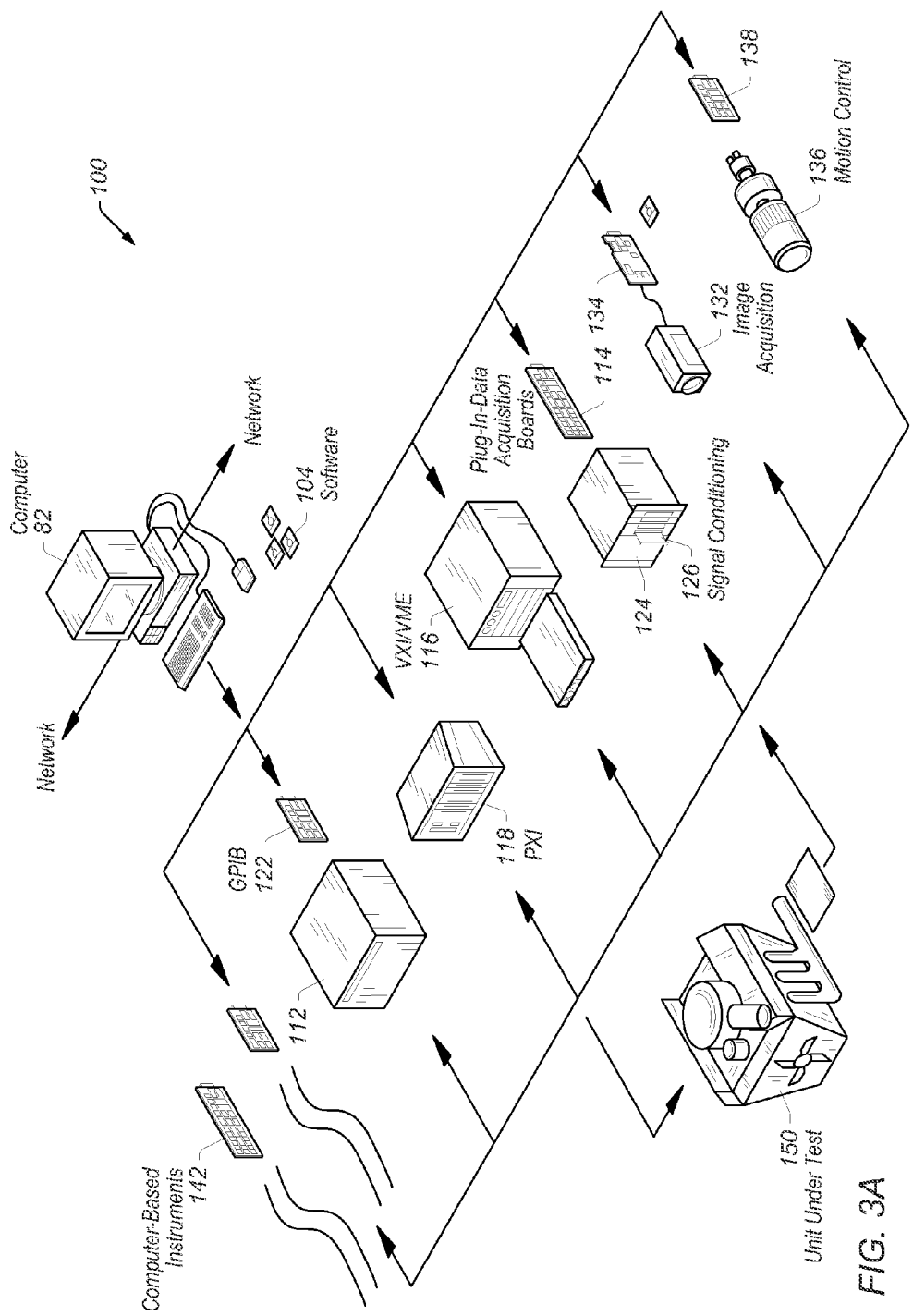
FIG. 3A illustrates a test system, according to one embodiment.
Figure 3B:
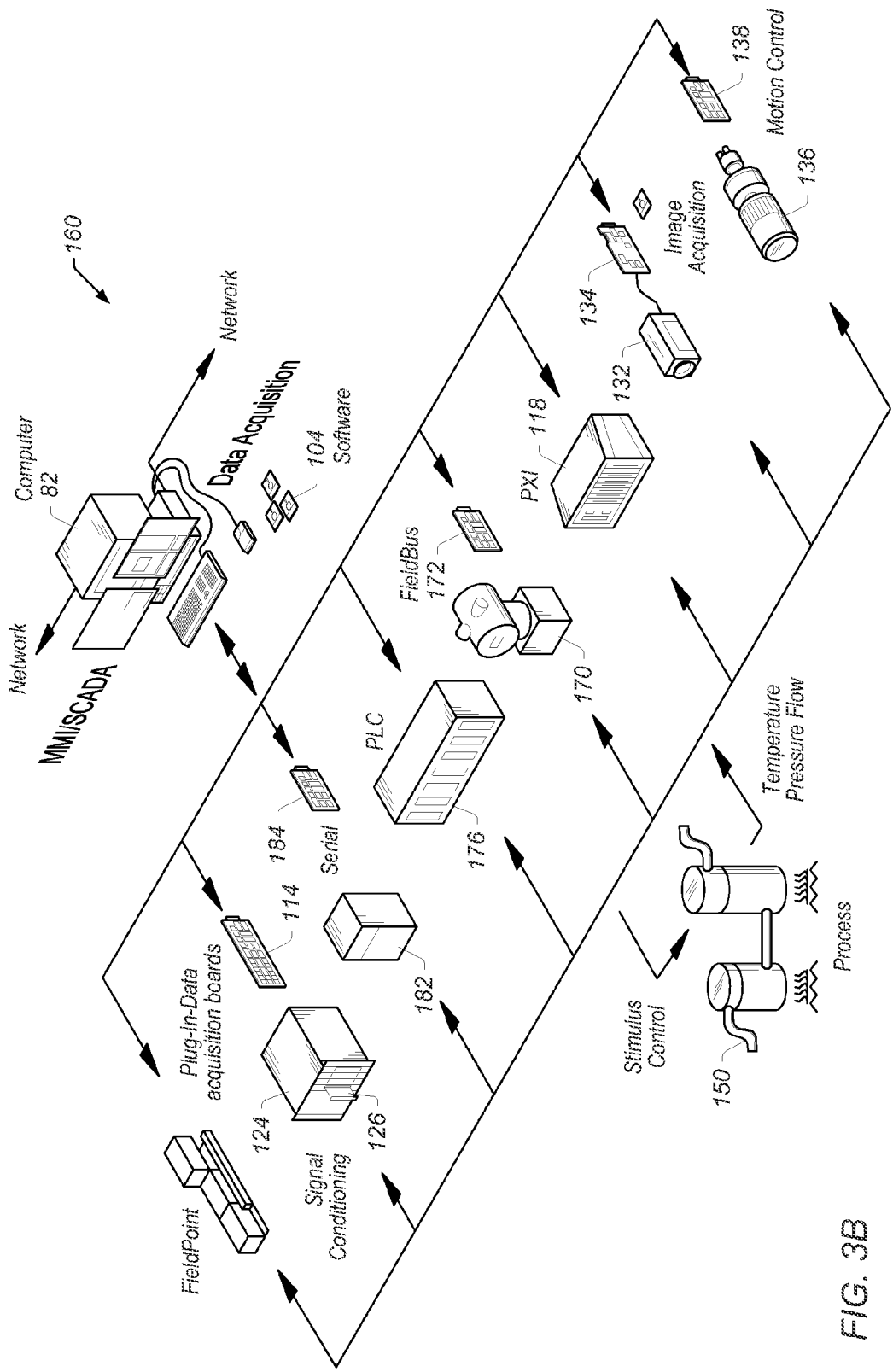
FIG. 3B illustrates another system, according to one embodiment.

FIGS. 3A-3B: Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

FIG. 3A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure, or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

FIG. 3B illustrates an exemplary industrial automation system 160 which may implement embodiments of the invention. The industrial automation system 160 may be similar to the instrumentation or test and measurement system 100 shown in FIG. 3A. Elements which are similar or identical to elements in FIG. 3A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the embodiments of FIGS. 3A and 3B above, one or more of the various devices may couple to each other over a network, such as the Internet. In one embodiment, the user operates to select a target device from a plurality of possible target devices for programming or configuration, e.g., using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 4A and 4B, may be referred to as virtual instruments (VIs).

Figure 4:
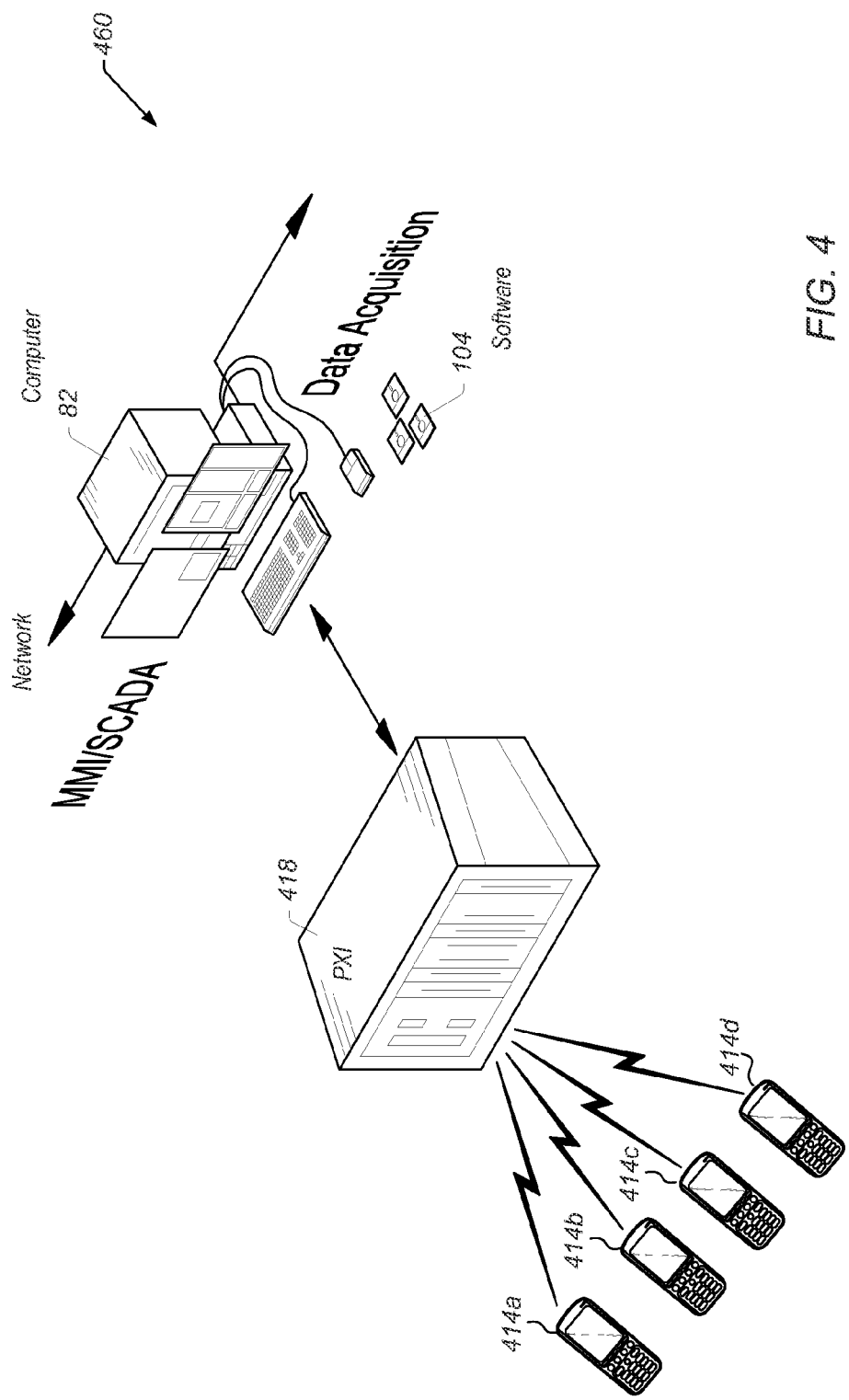
FIG. 4 illustrates an RF test system, according to one embodiment.

FIG. 4: Exemplary RF System

FIG. 4 illustrates an exemplary RF test system 460 which may implement embodiments of the invention. The RF test system 460 may be similar to the instrumentation or test and measurement system 100 shown in FIG. 3A. It should be noted that the RF signals may be of any type, including, but not limited to, non-Orthogonal Frequency-Division Multiplexing (non-OFDM) cellular standards, such as Wideband Code Division Multiple Access (WCDMA), the Code Division Multiple Access 2000 family of standards (CDMA2K), and Global System for Mobile Communications-Enhanced Data rates for GSM Evolution (GSM-EDGE), and OFDM cellular standards such as, Long Term Evolution (LTE), Worldwide Interoperability for Microwave Access (WiMAX), and Wireless Local Area Network (WiLan). Elements which are similar or identical to elements in FIG. 3A have the same reference numerals for convenience.

The system 460 may include a computer 82 which couples to one or more devices or instruments. The computer 82 may include one or more processors, a display screen, memory coupled to the one or more processors, and one or more input devices such as a mouse or keyboard as shown. In one embodiment, the PXI chassis 418 may include one or more RF measurement cards, such as those made by National Instruments. The one or more RF measurement cards may include a memory coupled to one or more processors. Additionally, the chassis 418 may include a memory coupled to one or more processors. Further, the RF measurement cards may be configured to stimulate, or transmit signals to, one or more UUTs, such as UE devices 414a-414d and also received signals from the one or more UUTs. In some embodiments, one or more signals from the one or more UUTs may be transmitted and received concurrently. In other embodiments, UE devices 414a-414d may transmit waveforms types corresponding to any cellular standard, such as, but not limited to, WCDMA, CDMA2K, GSM-EDGE, LTE, and so forth.

It should be noted that a UE device may be any of various types of computer systems devices which are mobile or portable and which performs wireless communications, such as mobile wireless devices. Examples of UE devices include mobile telephones (e.g., cellular telephones ("cell phones") or smart phones, portable gaming devices, laptops, tablets, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

It should also be noted that any of the system components described above may be used in any combination to perform embodiments of the method illustrated in FIG. 5 and described in detail below.

Figure 5:
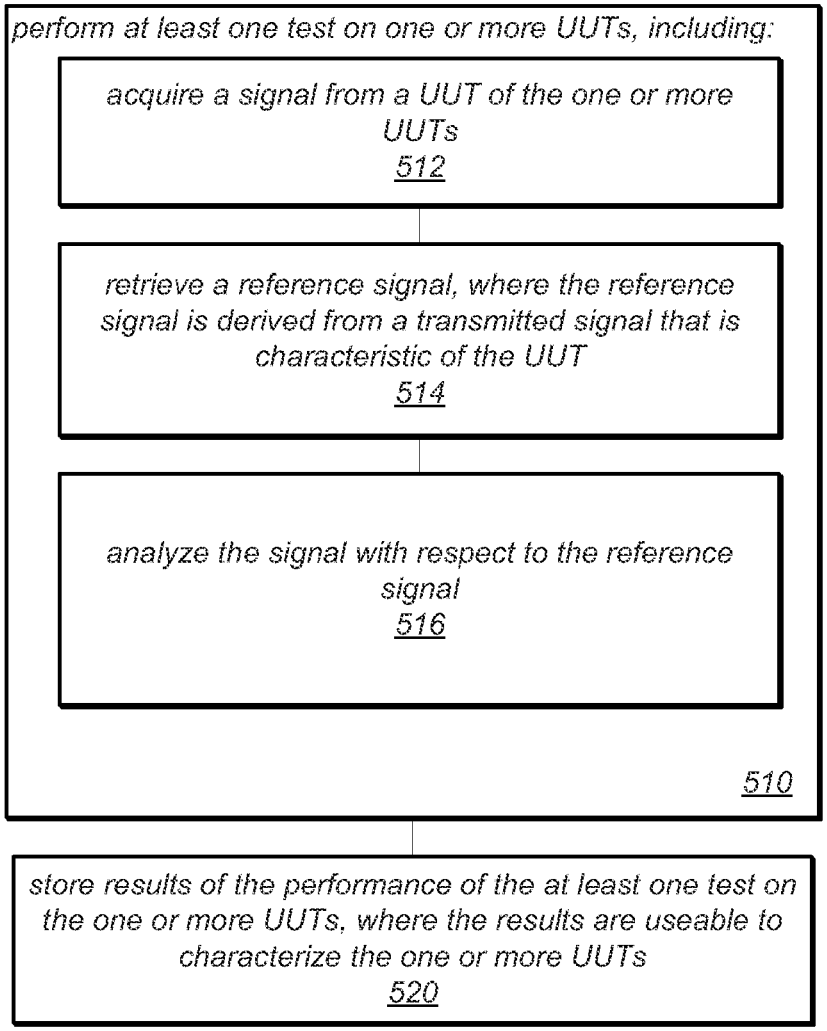
FIG. 5 illustrates a method for performing a test, according to one embodiment.

FIG. 5: Flowchart of a Method for Testing UUTs

FIG. 5 is a flowchart diagram of a method for implementing or performing a test process. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 510, at least one test on one or more UUTs may be performed. In some embodiments the at least one test may include a plurality of tests and the one or more UUTs may include a plurality of UUTs. In other embodiments, the at least one test may include at least one RF test. In such embodiments, the one or more UUTs may include one or more UE devices, such as wireless mobile devices.

In 512, a signal may be acquired from a UUT of one or more UUTs. As noted above, in some embodiments, the one or more UUTs may be a plurality of UUTs and the signal may be acquired from a first UUT of the plurality of UUTs. It should be noted that the signal acquired from the UUT may be of any type, including, but not limited to RF signals such as those used in cellular communication standards, such as WCDMA, CDMA2K, GSM-EDGE, LTE, and so forth.

In 514, a reference signal may be retrieved (e.g., from memory, possibly over a network). The reference signal may be derived from a transmitted signal that is characteristic of the UUT, or more generally, from a transmitted signal that is characteristic of the one or more UUTs. In some embodiments, the reference signal may be one of a plurality of reference signals, and may be selected or determined based on one or more criteria. Accordingly, in some embodiments, retrieving the reference signal may include determining one or more characteristics of the test (currently being performed, e.g., based on a test ID), the signal (transmitted from the UUT currently being tested of the at least one UUT), or, even the UUT (currently being tested) itself, and selecting the reference signal based on the determining, e.g., based on information determined regarding the test, the signal, or the UUT. In some embodiments where characteristics of the signal are determined, the characteristics may include the waveform type being transmitted, such as, but not limited to, OFDM, non-OFDM, or TDMA. In other embodiments, the characteristics may include the cellular standard being used by the UUT, such as, but not limited to, WCDMA, CDMA2K, GSM-EDGE, LTE, WiMax, or WiLan. Other attributes or characteristics may be used as desired.

In some embodiments, an initial test of the at least one test may be performed on an initial UUT of the one or more UUTs, where the initial UUT is representative of the one or more UUTs. To perform the initial test, a stimulus signal may be generated, where the stimulus signal stimulates the initial UUT and an initial response signal may be acquired from the initial UUT.

A (or the) reference signal may be derived, where deriving the reference signal may include removing distortions from the initial response signal. In one embodiment, the derivation may include removing distortion from the initial signal. In other embodiments, such as those involving OFDM and non-OFDM signals, removing distortion may include demodulating the initial signal. In embodiments involving TDMA signals, removing distortion may include both demodulating and re-modulating the initial signal.

The reference signal may be stored for subsequent retrieval, and the initial response signal may be analyzed with respect to the reference signal. In some embodiments, the reference signal may be one of a plurality of reference signals. In such embodiments, the reference signal may be retrieved based on determining one or more characteristics of the test (currently being performed, e.g., based on a test ID), the signal (transmitted from the UUT currently being tested of the at least one UUT), or, even the UUT (currently being tested) itself. In other words, the one or more characteristics may be determined, and the (appropriate) reference signal retrieved based on the determining.

In some embodiments, a marker may be used to synchronize the signal that may be acquired to the reference signal. The marker, in certain embodiments, may include a digital pulse, a software trigger, a power edge trigger, a correlation method such as cross-correlation, or some other form of signal synchronization.

In 516, the signal may be analyzed with respect to the reference signal. In certain embodiments, the analysis may include calculating metrics such as EVM, Modulation Accuracy EVM, Code Domain Power, EVMQPSK, and other similar signal metrics. In certain embodiments, the analysis may include use of the marker.

For example, a signal, m(n), may be acquired using a marker for synchronization, and may be mathematically represented as shown in equation 5.

$$m(n+p_0) = A_{n+p_0} e^{j\{\alpha(n+p_0) + \phi(n+p_0) + \theta\}} + Be^{j\beta} \quad (5)$$

In equation 5, $A_n$ is the power (magnitude) of the signal, $\phi(n)$ is the angle error corresponding to the frequency offset in the carrier signal, $\theta$ is the angle error corresponding to the phase offset in the carrier signal, $\alpha(n)$ is the valid angle in the constellation, $p_0$ is the fractional time offset between signal generation and signal acquisition caused by trigger jitter, and $Be^{j\beta}$ represents the power offset present in the acquired signal. Additionally, as shown in equation 6, $\Delta\omega$ is the frequency offset in *radians* per sample, where, $$\phi(n) = \Delta\omega_n \quad (6)$$

The reference signal, r(n), that may be retrieved, may be mathematically represented as shown in equation 7.

$$r(n) = A_n e^{j\alpha(n)} \quad (7)$$

The trigger jitter, $p_0$ may be estimated and removed using a combination of alignment algorithms as known in the art. Once this jitter is removed, equation 5 simplifies to equation 8.

$$m'(n) = A_n e^{j\{\alpha(n) + \phi(n) + \theta\}} + Be^{j\beta} \quad (8)$$

Now, the reference signal may be used to remove impairments in the acquired signal, such as carrier frequency offset (CFO), carrier phase offset (CPO), and power offset as shown in equation 9.

$$q(n) = \angle m'(n)r^*(n) = \Delta\omega_n + \theta \quad (9)$$

The frequency offset, $\Delta\omega$, and the phase offset, $\theta$, can then be determined using the least squares technique. The signal m"(n), shown in equation 10, is the signal m'(n) with the CFO and CPO removed.

$$m''(n) = A_n e^{j\alpha(n)} + Be^{j\beta} \quad (10)$$

The reference signal, r(n), may be employed to estimate and correct for the power offset, $Be^{j\beta}$ present in the signal, m"(n) as shown in equations 11-12.

$$\hat{B}e^{j\hat{\beta}} = \frac{1}{L}\sum_{n=0}^{L-1}(r(n) - m''(n)) \qquad (11)$$

$$m'''(n) = m''(n) - \hat{B}e^{j\hat{\beta}} \qquad (12)$$

In equations 11-12, $\hat{B}e^{j\hat{\beta}}$ represents the estimated power offset and L is the length of the acquired signal. Finally, the EVM may be calculated using the reference corrected signal, m"(n), and the reference signal, r(n), as in equation 13.

$$EVM = \sqrt{\frac{\sum_{n=0}^{L-1}|m'''(x) - r(n)|^2}{L}} \qquad (13)$$

In some embodiments, as mentioned above, the at least one test may comprise a plurality of tests, and for each respective test of the plurality of tests, a respective reference signal may be determined and retrieved. Accordingly, in one embodiment, for a first UUT of the one or more UUTs, a plurality of tests may be performed for which a respective reference signal is determined and retrieved for each respective test of the plurality of tests performed on the first UUT. In other embodiments where the one or more UUTs include a plurality of UUTs, the plurality of tests may be performed on the plurality of UUTs. Accordingly, a respective reference signal may be determined and retrieved for each respective test of the plurality of tests on a respective UUT. In other words, the same reference signal may be used for the same test repeated for different UUTs. Hence, in some embodiments, the retrieved reference signal is respective to the test and may be independent of the particular UUT being tested.

In 520, results of the performing the at least one test on the one or more UUTs, where the results are useable to characterize the one or more UUTs may be stored. It is envisioned that the storage of the results may be any one of a variety of forms, but at least includes storing the results to a memory. The storage may include transient storage such as RAM and display of results on a computer, such as computer system 82 of FIG. 2A above. Additionally, storage may include a network system, such as the network system described above in FIG. 2B. Accordingly, it is envisioned that the results may be stored in a database on a server. It is also envisioned, that in certain embodiments, the results may be used for other purposes in the manufacturing of the UUT, such as determining whether the UUT is within some specified quality control limit.

In certain embodiments, the at least one test may include at least one radio frequency (RF) test. In one embodiment, the UUT may be a UE device, such as depicted in 414a-414d of FIG. 4. It should be noted the term "UE" or "UE device" can be broadly defined to encompass any electronic, computing, and/or telecommunications device (or combination of devices) which is easily transported by a user and capable of wireless communication, such as mobile wireless devices. In such embodiments, the RF tests may be based on any cellular standard, including, but not limited to, WCDMA, CDMA2K, GSM-EDGE, LTE, WiMax, or WiLan. In certain embodiments, the reference signal may be stored in a memory on the computer system 82, computer system 90, or on a memory of any of various measurement hardware, such as PXI chassis 416.

For example, where the UUTs include mobile wireless devices, at least one RF test may be performed on one or more UUTs, including one or more mobile wireless devices. An RF signal may be acquired from a UUT, e.g., a mobile wireless device, of the one or more UUTs. An RF reference signal may be retrieved, where the RF reference signal is derived from a transmitted RF signal that is characteristic of the UUT. The RF signal may be analyzed with respect to the RF reference signal. The results of performing the at least one RF test on the one or more UUTs, where the results are useable to characterize the one or more UUTs, may be stored.

It is envisioned that in certain embodiments, regarding exemplary embodiments of the systems disclosed herein, reference signals corresponding to each cellular standard and signal type may be derived and stored in a database. In such embodiments, when a test is performed for a given cellular standard, the reference signal may be retrieved from the database of reference signals based on the cellular standard and/or signal type, although other bases for the retrievals may be used as desired, e.g., based on test IDs, etc. In certain embodiments, the database may be accessed over a network, such as that described in FIG. 2B above. Accordingly, in some embodiments, the database of reference signals may be stored on a server.

Figure 6:
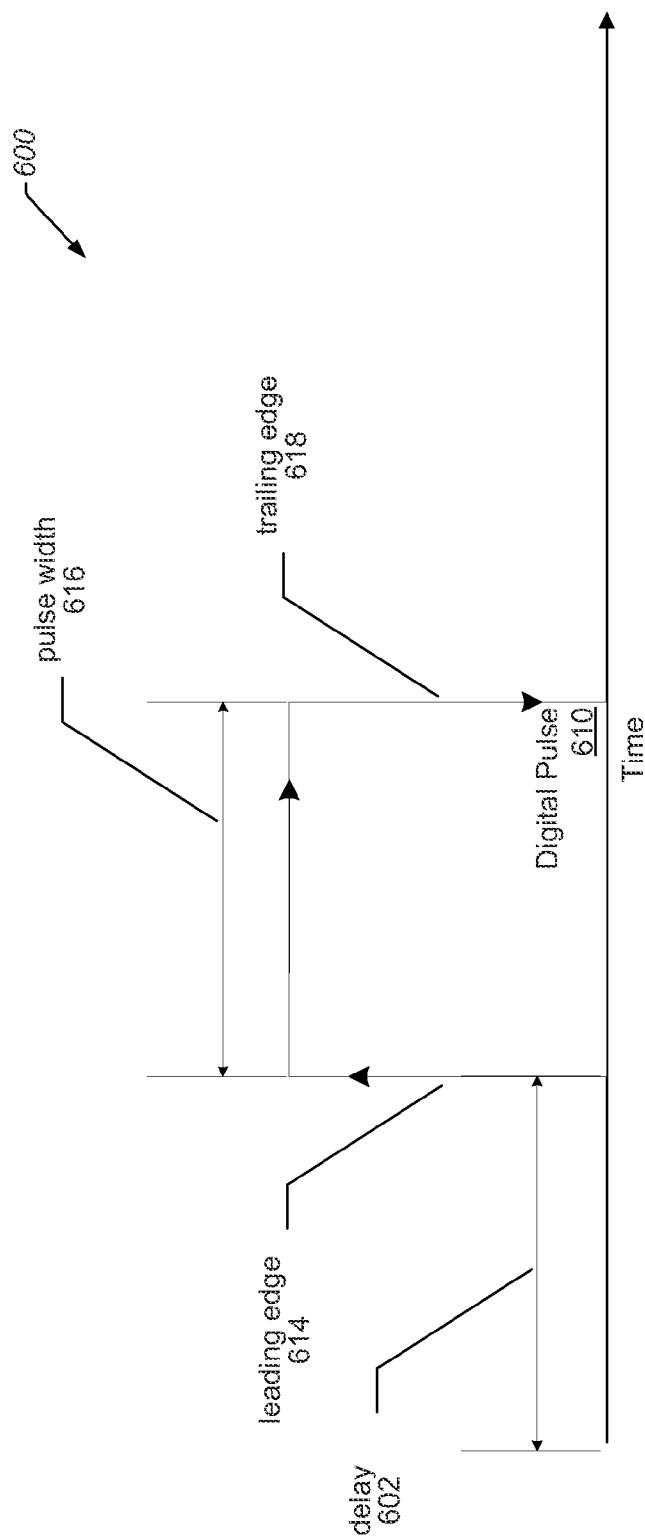
FIG. 6 illustrates a digital pulse signal, according to one embodiment.

FIG. 6: Exemplary Marker

FIG. 6 illustrates an exemplary marker 600. In one embodiment, the marker may be or include a digital pulse 610, as illustrated in FIG. 6. The digital pulse 610 has a leading edge 614, a pulse width 616, and a trailing edge 618. In one embodiment, an edge of the digital pulse 610 may initiate or trigger the acquiring of the response signal. In certain embodiments, performing the at least one test on the one or more UUTs may include generating a stimulus signal. The stimulus signal stimulates the UUT. The signal from the UUT may thus be or include a response signal, where the response signal is in response to the stimulus signal. In other words, the acquired signal may be in response to the stimulus signal, and thus may be a response signal.

Accordingly, in some embodiments, the leading edge 614 of the digital pulse may be synchronized to the initiation of the stimulus signal. In other embodiments, the leading edge 614 may be delayed for a time period from the initiation of the stimulus signal by delay 602. The time period of the delay 602 may be determined by or correspond to the elapsed time between initiating an initial stimulus signal and receiving an initial response signal. In other words, the (trigger) pulse may be delayed to adjust for a representative latency between sending a stimulus signal and receiving a response to the stimulus signal, where, e.g., the representative latency may be based on an actual latency in an initial test (wherein the initial stimulus signal is sent, and the initial response signal is received) and may be characteristic of latencies regarding the at least one test on the one or more UUTs.

In yet another embodiment, the trailing edge 618 of the digital pulse 610 may initiate or trigger the acquiring of the response signal. The pulse width 616 of the marker may be a time period from initiation of the stimulus signal, where the time period may be determined by the elapsed time between initiating an initial stimulus signal and receiving an initial response signal. In other words, the digital pulse may begin when the stimulus signal is initiated (or generated), and may trigger the acquiring once the expected latency period has elapsed, per the pulse width, where the pulse width is based on the above mentioned initial test (with the initial stimulus and initial response signal).

In certain embodiments, the marker may be used to synchronize the acquired signal to the reference signal. Additionally, while a digital pulse marker is described in detail herein, it is envisioned that other forms of triggering and synchronization may be used. Hence, in certain embodiments it is envisioned that the marker may be a software trigger. In other embodiments, the marker may be a power edge trigger. In yet other embodiments, the marker may include a correlation method such as cross-correlation.

It should be noted that while specific embodiments have been described and disclosed herein, it is intended that any features of any embodiments described herein may be combined or used together as desired, and further, may be implemented via any embodiments of the systems disclosed herein, or variants thereof.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions for testing units under test (UUTs), wherein the program instructions are executable to implement:
   performing at least one test on each UUT of a plurality of UUTs, comprising:
      for each respective UUT of the plurality of UUTs:
         acquiring a respective signal from the respective UUT;
         retrieving a reference signal, wherein the reference signal is derived from a transmitted signal that is characteristic of the respective UUT; and
         analyzing the respective signal with respect to the reference signal;
         wherein synchronization of acquiring the respective signal to the reference signal is based on a latency of an initial test, wherein the latency is determined by elapsed time between initiating an initial stimulus signal and receiving an initial response; and
      storing results of said performing the at least one test on each UUT of the plurality of UUTs, wherein the results are useable to characterize each UUT of the plurality of UUTs.

2. The non-transitory computer accessible memory medium of claim 1, wherein said acquiring is synchronized to the reference signal via a marker.

3. The non-transitory computer accessible memory medium of claim 2, wherein the marker is a digital pulse and wherein said acquiring the signal is initiated by an edge of the digital pulse.

4. The non-transitory computer accessible memory medium of claim 1, wherein said performing the at least one test further comprises:
   generating a stimulus signal, wherein the stimulus signal stimulates the respective UUT, wherein the respective signal from the respective UUT comprises a response signal, and wherein the response signal is in response to the stimulus signal.

5. The non-transitory computer accessible memory medium of claim 1, wherein a leading edge of a digital pulse is synchronized to initiation of a stimulus signal.

6. The non-transitory computer accessible memory medium of claim 1, wherein a leading edge of a digital pulse, useable for synchronization of the respective signal to the reference signal, is delayed for a time period from initiation of a stimulus signal, and wherein the time period is the latency.

7. The non-transitory computer accessible memory medium of claim 1, wherein said acquiring a response signal is initiated by a trailing edge of a digital pulse usable for synchronization of the respective signal to the reference signal, wherein a pulse width of the digital pulse is a time period from initiation of a stimulus signal, and wherein the time period is the latency.

8. The non-transitory computer accessible memory medium of claim 1, wherein said acquiring is synchronized to the reference signal via a marker, wherein the marker comprises one of the following:
   a digital pulse;
   a software trigger,
   a power edge trigger; or
   a correlation method.

9. The non-transitory computer accessible memory medium of claim 1, wherein the reference signal is one of a plurality of reference signals, wherein said retrieving comprises:
   determining one or more characteristics of the test, the signal, or the UUT; and
   selecting the reference signal based on said determining.

10. The non-transitory computer accessible memory medium of claim 1, wherein said performing at least one test on the one or more UUTs comprises performing at least one radio frequency (RF) test on at least one mobile wireless device.

11. A system for a test process, the system comprising:
   a processor; and
   a memory, coupled to the processor, wherein the memory stores program instructions executable by the processor to implement:
      performing at least one test on each UUT of a plurality of UUTs, comprising:
         for each respective UUT of the plurality of UUTs:
            acquiring a respective signal from the respective UUT;
            retrieving a reference signal, wherein the reference signal is derived from a transmitted signal that is characteristic of the respective UUT; and
            analyzing the respective signal with respect to the reference signal;
            wherein synchronization of acquiring the respective signal to the reference signal is based on a latency of an initial test, wherein the latency is determined by elapsed time between initiating an initial stimulus signal and receiving an initial response; and
         storing results of said performing the at least one test on each UUT of the plurality of UUTs, wherein the results are useable to characterize each UUT of the plurality of UUTs.

12. The system of claim 11, wherein said acquiring is synchronized to the reference signal via a marker.

13. The system of claim 11, wherein the marker is a digital pulse and wherein said acquiring the signal is initiated by an edge of the digital pulse.

14. The system of claim 11, wherein said performing the at least one test further comprises:
   generating a stimulus signal, wherein the stimulus signal stimulates the respective UUT, wherein the respective signal from the respective UUT comprises a response signal, and wherein the response signal is in response to the stimulus signal.

15. The system of claim 11, wherein a leading edge of a digital pulse is synchronized to initiation of a stimulus signal.

16. The system of claim 11, wherein a leading edge of a digital pulse, useable for synchronization of the respective signal to the reference signal, is delayed for a time period from initiation of a stimulus signal, and wherein the time period is the latency.

17. The system of claim 11, wherein said acquiring a response signal is initiated by a trailing edge of a digital pulse usable for synchronization of the respective signal to the reference signal, wherein a pulse width of the digital pulse is a time period from initiation of a stimulus signal, and wherein the time period is the latency.

18. The system of claim 11, wherein said acquiring is synchronized to the reference signal via a marker, wherein the marker comprises one of the following:
a digital pulse;
a software trigger,
a power edge trigger; or
a correlation method.

19. A computer-implemented method for performing testing on units under test (UUTs), comprising:
performing at least one test on each UUT of a plurality of UUTs, comprising:
for each respective UUT of the plurality of UUTs:
acquiring a respective signal from the respective UUT;
retrieving a reference signal, wherein the reference signal is derived from a transmitted signal that is characteristic of the respective UUT;
wherein synchronization of acquiring the respective signal to the reference signal is based on a latency of an initial test, wherein the latency is determined by elapsed time between initiating an initial stimulus signal and receiving an initial response; and
analyzing the respective signal with respect to the reference signal; and
storing results of said performing the at least one test on each UUT of the plurality of UUTs, wherein the results are useable to characterize each UUT of the plurality of UUTs.

20. The computer implemented method of claim 19, wherein a leading edge of a digital pulse is synchronized to initiation of a stimulus signal.

21. The computer implemented method of claim 19, wherein a leading edge of a digital pulse, useable for synchronization of the respective signal to the reference signal, is delayed for a time period from initiation of a stimulus signal, and wherein the time period is the latency.

22. The computer implemented method of claim 19, wherein said acquiring a response signal is initiated by a trailing edge of a digital pulse usable for synchronization of the respective signal to the reference signal, wherein a pulse width of the digital pulse is a time period from initiation of a stimulus signal, and wherein the time period is the latency.

23. The computer implemented method of claim 19, wherein said acquiring is synchronized to the reference signal via a marker, wherein the marker comprises one of the following:
a digital pulse;
a software trigger,
a power edge trigger; or
a correlation method.

* * * * *